June 30, 1931.  H. PERROT  1,812,168
BRAKE MECHANISM
Original Filed Jan. 29, 1924
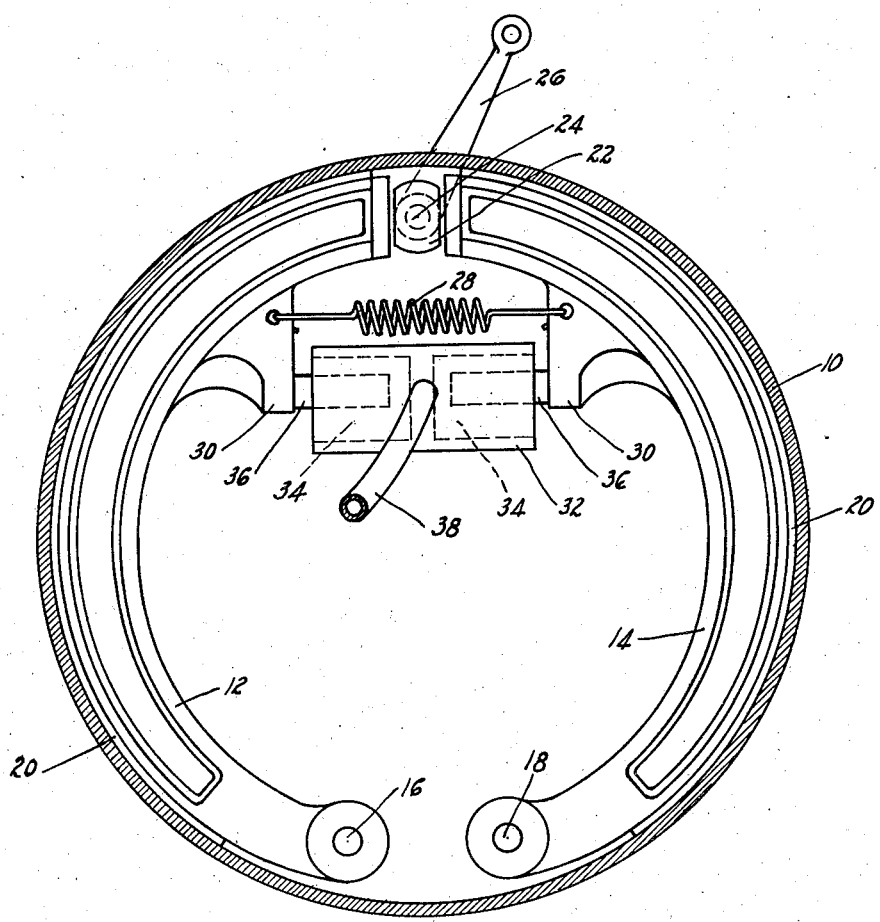
INVENTOR
HENRI PERROT
BY
Burton & McConkey.
ATTORNEYS.

Patented June 30, 1931

1,812,168

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE MECHANISM

Original application filed January 29, 1924, Serial No. 689,218. Divided and this application filed November 5, 1927. Serial No. 231,314.

This invention relates to improved brake mechanism intended particularly for use as an automobile brake.

An object of the invention is the provision of a vehicle brake having a plurality of applying devices structurally independent of each other, each of which is operable to apply the brake independently of the other and each of which is so constructed that a breakage therein would not affect the operation of the other applying device.

An important feature consists in the provision of a brake equipped with a mechanical applying device and a hydraulically operated applying device, each of which is entirely independent of the other and each of which is operable to apply the brake. The said applying devices may be operated independently or jointly as desired. Each applying device has a part which directly contacts the friction means of the brake but is disconnected therefrom so that the operation of such friction means by either applying device does not affect the operation of the other applying device.

Other objects and advantages of my invention will more fully appear from the following description, appended claims and accompanying drawing, wherein:

The figure of the drawing is a sectional view through a brake drum having friction means engageable therewith provided with my invention.

The present invention is a division of my application, Ser. No. 689,218, filed January 29, 1924.

In the drawing the brake drum, which is carried by the vehicle wheel in the usual manner, is indicated as 10. Friction means in the form of a pair of brake shoes 12 and 14 are pivoted at 16 and 18 respectively to be actuated into frictional engagement with the drum. Each brake shoe is shown as having a brake facing 20.

Between the separated free ends of the shoes is positioned a cam 22 carried by a cam shaft 24 and provided with a rock arm 26 whereby the cam may be actuated to spread the shoes against the drum. The shoes are held away from the drum by a spring 28. Each shoe has a shoulder 30.

Positioned between the shoulders 30 is a cylinder 32 provided with a pair of oppositely disposed pistons 34. Each piston carries a plunger 36 which is freely fitted therein and the plungers 36 engage the shoulders 30 of the shoes 12 and 14. A fluid pressure conduit 38 leads into the cylinder between the pistons from a suitable source of pressure supply through the control of which the pistons are forced outwardly projecting the plungers 36 against the shoulders 30 of the brake shoes and actuating the shoes.

It will be seen that the brake shoes may be actuated mechanically through the cam 22 independently of the hydraulic operating mechanism, or they may be actuated through the hydraulic operating mechanism independently of the cam.

What I claim is:

1. A braking system having a drum, friction members operable to be brought into engagement therewith, two entirely separate applying devices, one applying device having a part positioned between the friction members and operable to be brought directly into contact therewith to operate them, the other applying device having a pair of hydraulically operated parts, one for each friction member, adapted to be brought into contact therewith to operate the friction members.

2. A brake comprising, in combination, a drum, friction means engageable therewith having adjacent separable ends, two applying devices structurally independent throughout, each operable to actuate the friction means, one applying device having a part positioned between the separable ends of the friction means operable to apply the same, the other applying device having a pair of opposed hydraulically operated parts engaging the friction means to apply the same.

3. A brake comprising, in combination, a drum, friction means engageable therewith having adjacent separable ends, two applying devices structurally independent throughout, each operable to actuate the friction means, one applying device having a part positioned between the separable ends of the friction means operable to apply the same, the other applying device having a pair of opposed hydraulically operated parts engaging the friction means to apply the same, and a retracting spring engaging the friction means exerting a pressure thereon to hold the same away from the drum, said spring being positioned between the friction means applying parts of the two applying devices.

4. A brake having a rotatable drum, friction means within the drum having free separable ends, two devices for applying the friction means, one applying device connected therewith through mechanical linkage and the other applying device provided with fluid operated mechanism comprising a cylinder having opposed fluid operated pistons one engaging one free end of the friction means and the other engaging the other free end thereof, whereby said friction means may be operated by either applying device independently of the other.

5. A brake having a rotatable drum, friction means within the drum having free separable ends, two devices for applying the friction means, one applying device connected therewith through mechanical linkage and the other applying device provided with fluid operated mechanism comprising a cylinder having opposed fluid operated pistons one engaging one free end of the friction means and the other engaging the other free end thereof, whereby said friction means may be operated by either applying device independently of the other, one applying device engaging the friction means directly between the separated free ends thereof and the other applying device engaging the friction means at a point distinct from its ends but in close proximity thereto.

6. In a brake mechanism of the class described, the combination with a brake-drum, of a brake engageable with said drum and provided with abutments, a fluid-pressure-operated motor having direct thrust connection with said abutments to move the brake into engagement with said drum, manually operated means to apply the brake to said drum and operatively connected to the ends thereof, and means to release said brake from braking engagement with said drum after either a power or manual application thereof.

7. In brake mechanism of the class described, the combination with a brake-drum, of a brake engageable with said drum, a brake-cylinder, opposed pistons working in said cylinder and operatively connected to the ends of the brake to move said brake into braking engagement with said drum, other means for applying said brake to said drum including a lever moved by the operator, and means to release said brake.

8. In brake mechanism of the class described, the combination with a brake-drum, of a brake means for applying said brake mechanically, a brake-cylinder, opposed pistons working in said cylinder, connections between said pistons and the end portions of said brake to move the brake into engagement with said drum or to permit movement of said end portions independently, and means to release said brake after application either by said pistons or by said mechanical means.

9. In brake mechanism of the class described, the combination with a brake-drum, of a brake engageable with said drum, a brake-cylinder, opposed pistons working in said cylinder and operatively connected to the ends of the brake to move said brake into braking engagement with said drum, other means for applying said brake to said drum including a lever moved by the operator, and means to release said brake, said release means positioned between said two applying means and engaging the brake between the points at which it is engaged by said two applying means.

10. In a brake mechanism of the class described, the combination with a brake-drum, of a brake engageable with said drum and provided with abutments, a fluid-pressure-operated motor having direct thrust connection with said abutments to move the brake into engagement with said drum, manually operated means to apply the brake to said drum and operatively connected to the ends thereof, and means to release said brake from braking engagement with said drum after either a power or manual application thereof, said release means positioned between said fluid-pressure-motor and the ends of the brake and connected with the brake to normally hold it in engagement with said manually operable means and with the thrust connections of the fluid-pressure-motor.

11. Brake mechanism comprising, in combination, a brake drum, brake friction means having spaced apart ends movable into engagement with the drum, manual means operable to move said ends equally toward the drum, and power means including a pair of independently movable floating units operable to move both of said ends toward the drum but adaptable to exert a follow up thrust on one end toward the drum notwithstanding the lack of movement of the opposite end toward the drum.

12. Brake mechanism comprising, in combination, a drum, brake friction means having spaced apart ends movable into engagement with the drum, operating means adaptable to move said ends equally and with equal thrust toward the drum, and auxiliary operating means including a pair of independently movable floating units operable to move said ends with equal thrust toward the drum but adaptable to exert a follow up thrust on one end to move it toward the drum notwithstanding the lack of movement of the opposite end toward the drum.

13. Brake mechanism comprising, in combination, a drum, brake friction means having spaced apart ends movable into engagement with the drum, operating means adaptable to move said ends equally and with equal thrust toward the drum and auxiliary operating means including a pair of independently movable floating units operable to move said ends with equal thrust toward the drum but adaptable to exert a follow up thrust on either end to move it toward the drum notwithstanding the lack of movement of the opposite end toward the drum.

In testimony whereof, I have hereunto signed my name.

HENRI PERROT.